United States Patent [19]
Goldstein et al.

[11] Patent Number: 4,772,880
[45] Date of Patent: Sep. 20, 1988

[54] SHOPPING CART ANTI-THEFT SYSTEM

[76] Inventors: Larry W. Goldstein, 5958 Vista Loop; Robert H. Goldstein, 5951 Vista Loop, both of San Jose, Calif. 95124

[21] Appl. No.: 821,018

[22] Filed: Jan. 21, 1986

[51] Int. Cl.$^4$ .................. G08B 13/14; B62D 39/00
[52] U.S. Cl. ........................ 340/571; 280/33.99 C; 340/693
[58] Field of Search .............. 340/571, 693, 53, 64, 340/63; 455/66–68; 280/33.99 C; 188/111; 180/287

[56] References Cited
U.S. PATENT DOCUMENTS

| | | | |
|---|---|---|---|
| 1,790,427 | 1/1931 | Kirton | 280/89 X |
| 2,964,140 | 12/1960 | Berezny | 188/111 |
| 3,031,037 | 4/1962 | Stollman | 188/111 |
| 3,495,688 | 2/1970 | Isaaks | 188/31 |
| 4,023,138 | 5/1977 | Ballin | 340/64 |
| 4,242,668 | 12/1980 | Herzog | 340/539 |
| 4,260,982 | 4/1981 | DeBenedictis et al. | 340/539 |
| 4,337,462 | 6/1982 | Lemelson | 340/572 |
| 4,591,175 | 5/1986 | Upton et al. | 280/33.99 C |

*Primary Examiner*—Glen R. Swann, III
*Assistant Examiner*—Thomas J. Mullen, Jr.
*Attorney, Agent, or Firm*—Ronald W. Reagin; Stephen L. King

[57] ABSTRACT

An anti-theft assembly for carts including a housing adapted to fit adjacent a wheel of a cart, a receiver within the housing for sensing the passage of the cart beyond a preselected range and providing a signal indicative thereof, and an arrangement responsive to the signal for lowering an arm into the direct path of the adjacent wheel.

3 Claims, 4 Drawing Sheets

SHOPPING CART ANTI-THEFT SYSTEM

BACKGROUND OF THE INVENTION

This invention relates to anti-theft systems and more particularly to anti-theft systems used with supermarket shopping carts.

Supermarket shopping carts and similar carts used by other retail and commericial organizations are often quite expensive because they must withstand constant strenuous use and, consequently, must be constructed of the relatively expensive materials which are able to withstand such use. Such carts are often stolen or carried away and abandoned. Consequently, the cost of providing these expensive carts has become a significant part of the overhead of a number of businesses. For this reason, many anti-theft devices have been suggested for use with such carts.

For example, U.S. Pat. No. 4,242,668 to Herzog discloses a shopping cart theft prevention system which includes a transmitter and a receiver carried by the cart. When the cart is taken beyond a predetermined distance from its place of use, a signal from the transmitter disables the cart by causing the front set of wheels to be retracted upwardly so that the front portion of the cart drags on the ground. Such a system requires that the carts be designed or modified for use with the particular system. Modification of carts presently in use would be very expensive.

U.S. Pat. No. 2,964,140 to Berezny discloses another anti-theft system for shopping carts in which magnetic material is embedded in the pavement surrounding the facility with which carts are to be used, and an arrangement which is responsive to magnetic field variations is provided for locking the wheels of the cart when the cart is removed from the area. Again, the system requires a substantial investment in changes to the existing carts and in the installation of pavement containing magnetic material. U.S. Pat. No. 3,495,688 to Isaacks shows another arrangement utilizing carts with magnetically actuated locking wheels.

Each of these systems provides a solution to the problem, and each of these systems is quite expensive to implement. Some of these systems are so expensive that the economics of providing such a system outweigh the advantages provided thereby. Each of the systems requires that modifications be made to the carts themselves. Certain of these systems can only be used with specifically designed carts and, consequently, cannot be used with the large variety of carts presently in use. Known systems which utilize receiver-transmitter arrangements have proven to be quite expensive in use and require constant replacement of batteries utilized in the receivers.

It is, therefore, an object of this invention to provide an improved anti-theft device for shopping and similar carts which device may be utilized on a great variety of different carts without modification of the carts.

It is another object of this invention to provide an electronic system with extremely low power requirements for preventing theft of shopping carts.

SUMMARY OF THE INVENTION

These and other objects of this invention are realized in a system which includes a transmitter adapted to be positioned near and plugged into a wall socket in a retail business, and a clamp-on assembly which is adapted to fit without modification a wide variety of shopping carts. The clamp-on assembly houses a battery-powered receiver for sensing when the cart leaves the area adjacent the business and has means for disabling the wheels of the shopping cart when the shopping cart is outside the area. A mechanical arrangment is provided within the clamp-on assembly which responds to signals from the receiver to disable the cart by causing at least one of its wheels to turn to an angle such that the cart must be driven in a circle. The clamp-on arrangement requires little power to operate and, thus, may function for as long as five years before its batteries need be replaced.

These and other objects and features of the invention will be better understood from a consideration of the detailed description taken in accordance with the drawings in which like elements are referred to by like reference characters throughout the several views.

DESCRIPTION OF THE PREFERRED EMBODIMENT

Figure 1:
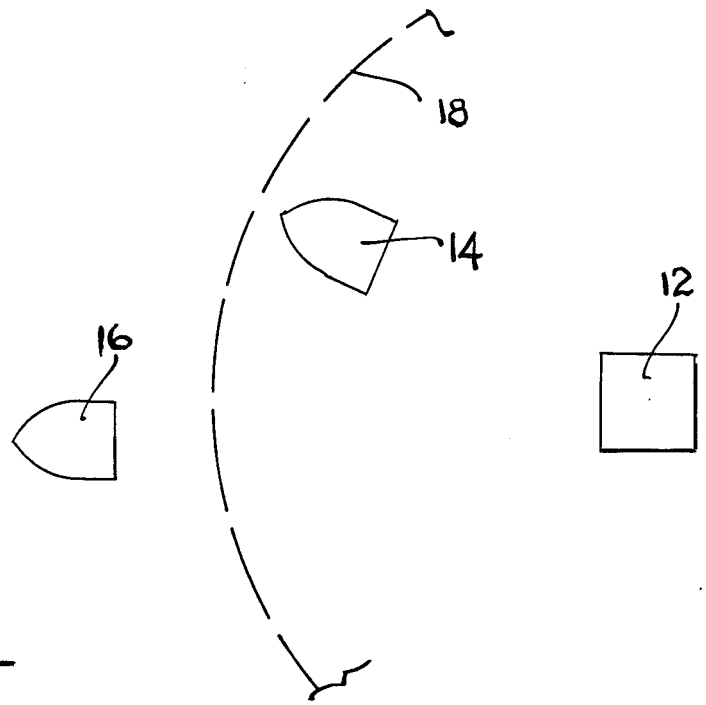
FIG. 1 is a diagram illustrating the major components of a system constructed in accordance with the invention.

In FIG. 1 there is shown a system in accordance with the invention in which a transmitter 12 is placed conveniently adjacent a source of power such as a normal 112 volt, 60 cycle wall plug. The transmitter 12 transmits continuously to receivers associated with all of the shopping carts within its preselected range. A first shopping cart 14 and a second shopping cart 16 are shown, respectively, within and without the range of the transmitter 12 which is defined by an arc 18 in FIG. 1. While within the circle bounded by the arc 18 which defines the range of the transmitter 12, shopping carts such as the shopping cart 14 operate normally. Once outside that range, however, a shopping cart such as the shopping cart 16 is rendered inoperative by the system of this invention which causes at least one wheel of that cart 16 to be disabled.

Figure 2:
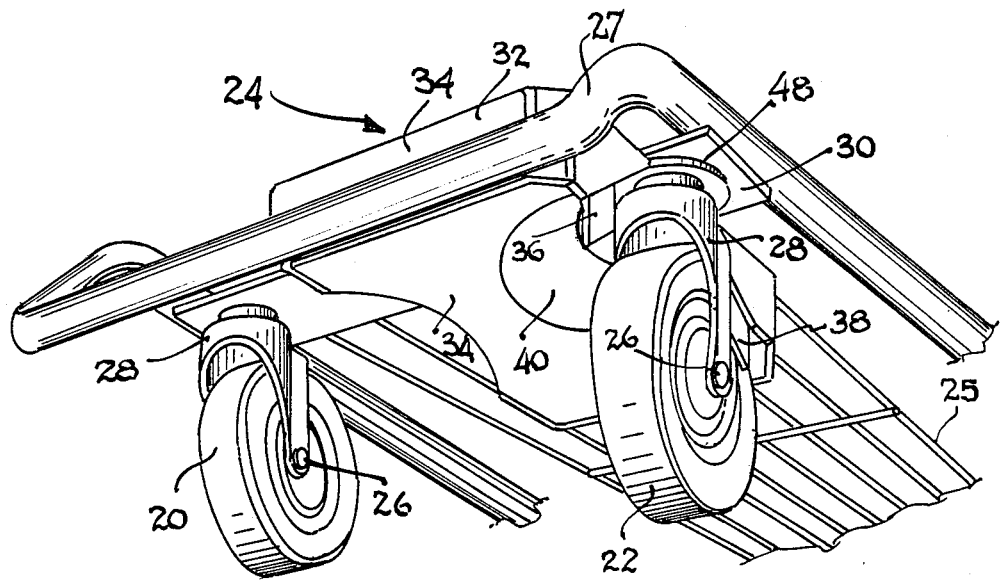
FIG. 2 is a perspective view illustrating a portion of a cart with the anti-theft assembly of the invention installed thereon.
Figure 3:
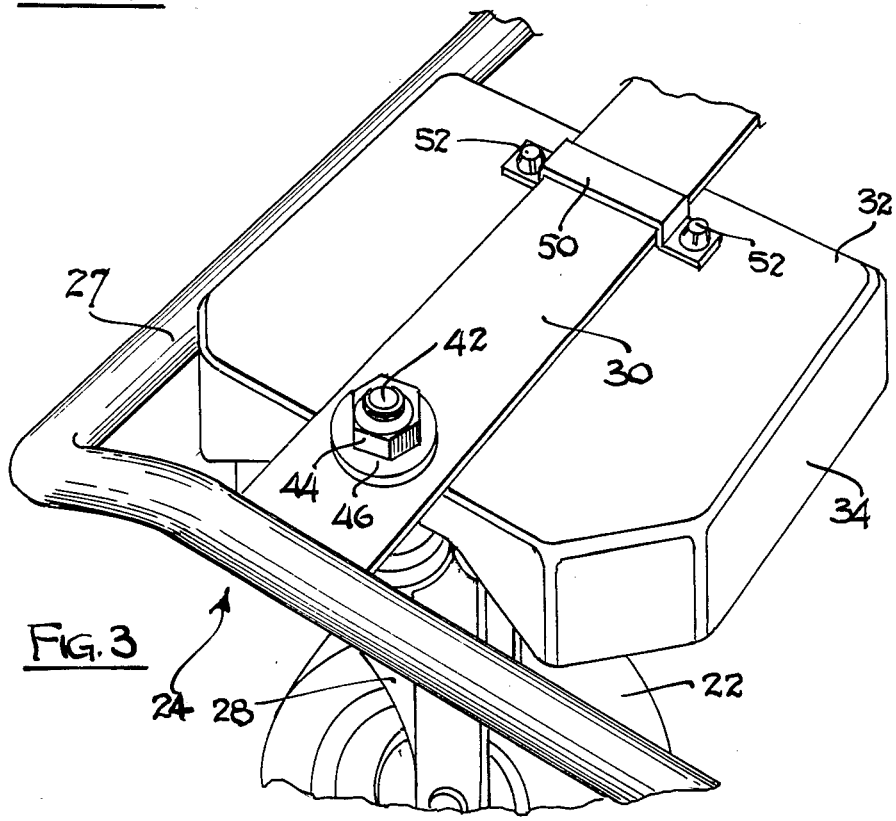
FIG. 3 is another perspective view illustrating the anti-theft assembly of FIG. 2 from another angle.

The means by which the wheels of the shopping carts are disabled is more clearly show in FIGS. 2 and 3. FIG. 2 illustrates, in perspective view, a cut away portion of a shopping cart 24 illustrating the front wheels 20 and 22. Each of the wheels 20 and 22 is attached by an axle 26 to a yoke 28 which is rotatably connected to a cross member 30 of the cart 24.

In the arrangement of FIG. 2, only one of the wheels 22 of the cart 24 is provided with a disabling mechanism 32. The disabling mechanism 32 includes an outer shell 34 within which is arranged a receiver (not shown in FIG. 2) for receiving transmissions from a transmitter such as the transmitter 12 illustrated in FIG. 1. Upon passing out of range of the transmitter 12 of FIG. 1, the receiver causes a pair of arms 36 and 38 to be lowered from the assembly 32 into a position in which they interfere with the direct forward and reverse travel of the wheel 22 and allow the wheel 22 to run only along curved paths. When first lowered, the arms 36 and 38 may ride upon the tread of the wheel 22. However, the wheel 22 must of necessity move off a directly forward and backward line; and, once it has done so, the arms 36 and 38 drop to their lowest positions so that the wheel 22 is unable to return to a straight path because the arms 36 and 38 impede its direction of travel. Thus, the cart 24 is limited to a curving path, to one side or the other, which essentially eliminates its ability to be moved for any distance. It has been determined that positioning the arms 36 and 38 to require the wheel 22 to turn at least five degrees and not more than thirty degrees from a straight line path, and preferably between five degrees and fifteen degrees, provides the most functional disabling.

As may be seen from FIG. 2, the outer case 34 of the mechanism 32 is shaped to fit easily into the space on a cart 24 lying below a wire shelf 25 and behind a bar 27 which is the main support for the wheels of the cart 24. The case 34 has a frustoconical section 40 defined along its side nearest the wheel 22 allowing the wheel 22 to rotate freely upon the axis about which the yoke 28 rotates as it joins the cross member 30. Such a case 34 obviously fits most shopping carts now in use.

FIG. 3 is a another prospective view of a portion of a shopping cart 24 illustrating the upper side of the mechanism 32 and the means by which the case 34 is attached to the shopping cart 24. As may be seen in FIG. 3, a bolt 42 projects through the cross member 30 and is secured with a nut 44 and a washer 46. This bolt 42 is the bolt which normally attaches the yoke 28 (only a portion of which is shown in FIG. 3) to the cross member 30. To attach the mechanism 32, the nut 44 is withdrawn and the yoke 28 lowered from the cross member 30. The mechanism 32 is then placed in position so that a flange 48 (shown in FIG. 2) with an aperture therein is positioned directly in line with the hole for the bolt 42 in the cross member 30. When the wheel 22 and the yoke 28 are again positioned so that the bolt 42 extends through the hole in the cross member 30, the flange 48 is held in place so that the mechanism 32 is clamped tightly against the cross member 30. The other side of the upper surface of the mechanism 32 is secured to the cross member 30 by a mounting strap 50 which is attached to the case 34 by a pair of tamper-proof screws 52.

As may be seen from FIGS. 2 and 3, the mechanism 32 which includes the receiver and the means for disabling the wheels of the shopping cart 24 is adapted to be easily mounted to the shopping cart shown in those figures without any modifications whatsoever to the shopping cart. Moreover, the easy connection by means of the bolt 42 which secures the wheels to the cart and a simple mounting strap makes the mechanism 32 easily adaptable to a great number of different shopping carts without modifications of those carts in any manner.

Figure 4:
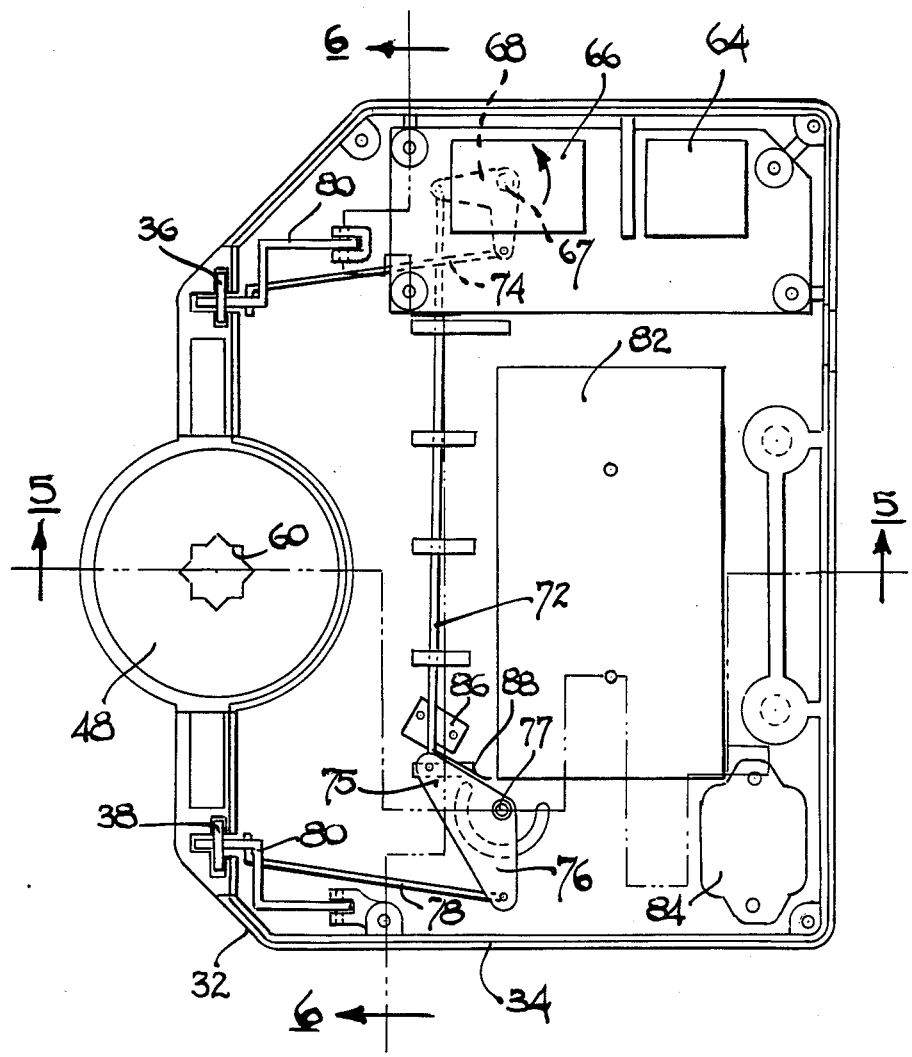
FIG. 4 is a top view illustrating the interior of the anti-theft assembly of FIGS. 2 and 3.

FIG. 4 illustrates the interior of the mechanism 32. As may be seen in FIG. 4 the mechanism includes the outer case 34, only one section of which, the upper, is shown in FIG. 4. At the center left of the drawing in FIG. 4 is shown the flange 48 with an aperture 60 therein through which extends the bolt 42 and a portion of the upper base of the yoke 28 by which the yoke 28 is secured to the cross member 30. Positioned within the interior of the case 34 in the preferred embodiment of the invention is a circuit board 62 which has positioned thereon a receiver 64 and a servo-mechanism 66. Each of the receiver 64 and the servo-mechanism 66 are constructed in a manner well known to the art and, therefore, are not illustrated in detail in FIG. 4. An exemplary circuit board 62 is a receiver/servo manufactured by Sanwa Electric, Osaka, Japan, as part number OM421R.

The receiver 64 is preferrably designed for ultra-low power drain in the idle state. Both, when the cart 24 is within range of the transmitter and after the cart has gone outside of the range of the transmitter and the assembly 32 has been actuated to disable the wheels, this ultra-low power state is assumed. The receiver 64 contains an amplitude detector circuit selected to provide a signal when the amplitude of the received signal falls below the threshold level provided by the transmitter 12 at the desired extreme range. Consequently, as the cart 24 crosses the threshold defined by the arc 18 in FIG. 1 so that it is out of range of the transmitter 12, the receiver 64 provides a continuous signal which is utilized to deactivate the cart 24 and activate a buzzer. This signal operates the servo-mechanism 66 which rotates a shaft 67 approximately 80°. Rotation of the shaft 67 in a clockwise direction as shown in FIG. 4 causes the rotation of an elbow lever 68 affixed to the shaft 67 of the servo-mechanism 66. The lever 68 is connected to solid linkages 72 and 74 which are preferrably constructed of steel. The linkage 72 is connected to an arm 75 of another elbow lever 76 mounted to rotate about an axis 77. The lever 76 is rotatably mounted to actuate a second solid linkage 78. Each of the linkages 74 and 78 is connected to an arm 80, the actuation of which cause the arms 36 and 38 to drop into place in the path of the associated wheel. In the preferred embodiment, the elbow levers 68 and 76, the arms 80, and the arms 36 and 38 may all be constructed of steel, plastic, or aluminum.

Also arranged within the case 34 is a battery housing 82 which provides power to operate the receiver 64, the servo-mechanism 66, and a buzzer 84. A preferred arrangement includes four alkaline "C" cells within the housing 82. In the preferred embodiment, a Star Micronics PMB03 buzzer manufactured in Osaka, Japan, is used. The buzzer 84 is actuated by the threshold signal which operates the servo-mechanism 66 to lower the arms 36 and 38. This alarm is selected to be such that it may be heard throughout the area of the particular shopping cart and aids in causing the cart to be abandoned. It is left on until the arms 36 and 38 are retracted. The servo-mechanism 66 is connected to a switch 86 which has a mechanical actuator 88 extending therefrom. As the elbow lever 76 rotates into position to move the linkage 78, the arm 75 comes in contact with the extended actuator 88 and closes the switch 86 which cuts off power to the servo-mechanism 66. This action takes place only when the arms 36 and 38 are fully extended.

Figure 5:
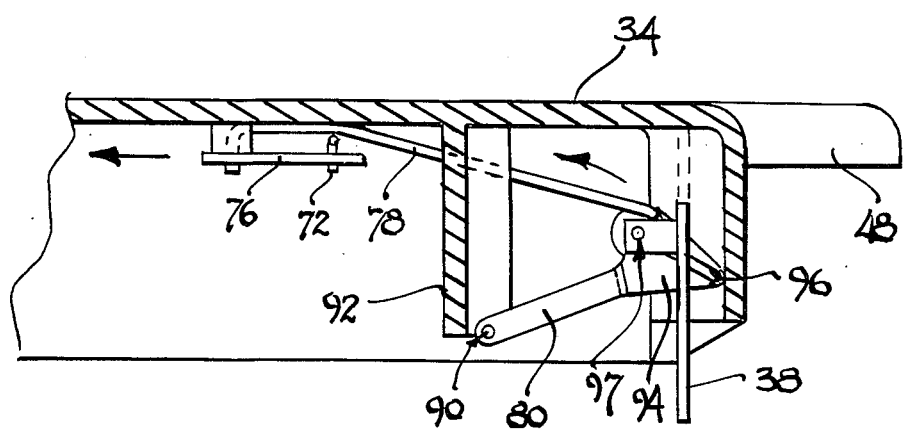
FIG. 5 is a side view of a detail of FIG. 4.
Figure 6:
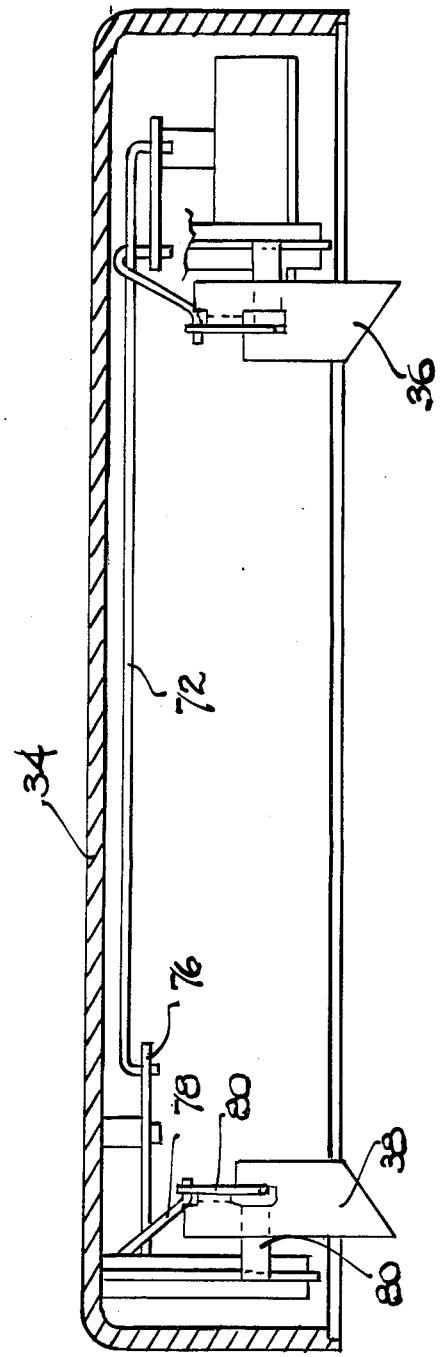
FIG. 6 is a front view of a detail of FIG. 4.

FIGS. 5 and 6 better illustrate the arrangement by which the arms 36 and 38 are lowered into the path of the associated wheel. As shown therein, the arms 36 and 38 are in the lowered positions blocking the path of the associated wheel. Each arm 80 is rotatably mounted at a point 90 to a post 92 which projects from the interior of the case 34. The arm 80 has a face 94 carrying an extended slot 96. The end of the linkage 78 opposite the lever 76 is bent and rotatably mounted through the face 94. A projection 97 from each arm 36 and 38 carries a pin 98 which rides in the slot 96.

Thus, when the linkage 78 moves to the right in FIG. 5 in response to rotation of the shaft 67, the linkage 80 rotates downward clockwise about the point 90 and moves the arm 38 downward into the path of the associated wheel. The linkage 74, in like manner, causes the arm 36 to move downward into the path of the associated wheel. When the linkage 78 moves to the left in FIG. 5 in response to rotation of the shaft 67, the linkage 80 rotates upward counter-clockwise about the point 90 and moves the arm 38 upward out of the path of the associated wheel. The linkage 74, in like manner, causes the arm 36 to move upward out of the path of the associated wheel.

It should be noted that the receiver 64 causes the two arms 36 and 38 to drop into position and then goes into the low power state in which those levers 36 and 38 remain in position impeding the wheels of the cart 24. This state requires very little power. Moreover, in the normal operating condition in which the arms 36 and 38 are retracted, the receiver 64 is in the low power state. Thus, very little power is used by the mechanism 32 in either of its long term states.

As may be seen in FIG. 4, if an attempt is made to force the arms 36 and 38 upwardly so that they are out of the position in which they impede the wheel 22, the switch 86 is released which reactuates the servo-mechanism 66 and causes the levers 36 and 38 to again be put into the lowered position. This continues for as long as any attempt is made to force the levers 36 and 38 out of position.

The receiver 64 and servo-mechanism 66 of the preferred embodiment of the invention are also provided with well known circuitry such that when the cart 24 again comes within the range of the transmitter 12, the shaft 67 is caused to rotate in the counter-clockwise direction thereby withdrawing the arms 36 and 38 from the path of the associated wheel.

While but one arrangement has been shown by which the invention may be practised, various other arrangements will be obvious to those skilled in the art which fall within the scope and teaching of the invention. It is therefore intended that the scope of this invention shall be limited only by the claims which follow.

What is claimed is:

1. An anti-theft assembly for carts having wheels which rotate about horizontal axes and which vary their direction about essentially vertical axes and in which the wheels are held in position by supporting means comprising a housing adapted to fit to the support means adjacent a wheel of a cart, means within the housing for sensing the passage of the cart beyond a preselected range and providing a signal indicative thereof, and means responsive to the signal for lowering an arm into the direct path of the adjacent wheel whereby the direction of the wheel is varied about its vertical axis to be other than straight ahead.

2. An anti-theft assembly as claimed in claim 1 in which the means responsive to the signal for lowering an arm lowers a first arm into the forward path of the adjacent wheel and a second arm into the reverse path of the adjacent wheel.

3. An anti-theft assembly as claimed in claim 1 further comprising means for fixing the assembly to a cart including a portion of the assembly having an aperture therein adapted to accept a vertical axle holding the adjacent wheel, the assembly being positioned and held in place thereby.

* * * * *